United States Patent
Lilly

[19]

[11] Patent Number: 6,111,215
[45] Date of Patent: Aug. 29, 2000

[54] MINATURE BATTERY POWERED ARC WELDER

[76] Inventor: Leslie G. Lilly, 1750 Via Pacifica, #N101, Corona, Calif. 91718

[21] Appl. No.: 09/178,256

[22] Filed: Oct. 23, 1998

[51] Int. Cl.[7] .................................................. B23K 9/09
[52] U.S. Cl. .............................. 219/130.51; 219/137 PS
[58] Field of Search ................................ 219/130.1, 130.21, 219/130.31, 130.32, 160.33, 130.4, 130.51, 132, 137 PS

[56] References Cited

U.S. PATENT DOCUMENTS

| | | |
|---|---|---|
| 1,509,006 | 9/1924 | Thomas . |
| 2,091,871 | 8/1937 | Meier . |
| 2,487,582 | 11/1949 | Parris . |
| 2,836,703 | 5/1958 | Boyle . |
| 2,843,726 | 7/1958 | Kiernan . |
| 2,866,076 | 12/1958 | Aversten . |
| 3,301,996 | 1/1967 | Bidwell ................................ 219/130.1 |
| 4,484,055 | 11/1984 | Haines et al. ............................ 219/75 |
| 4,590,357 | 5/1986 | Winkler . |
| 4,801,780 | 1/1989 | Hayes ................................... 219/130.1 |
| 5,086,208 | 2/1992 | Habermann . |
| 5,233,159 | 8/1993 | Day ...................................... 219/130.1 |
| 5,250,786 | 10/1993 | Kikuchi et al. . |
| 5,410,126 | 4/1995 | Miller et al. ............................. 219/130.1 |

FOREIGN PATENT DOCUMENTS

| | | |
|---|---|---|
| 56-77068 | 6/1981 | Japan ................................. 219/130.4 |
| 2316244 | 2/1998 | United Kingdom . |
| 97/34727 | 9/1997 | WIPO . |

*Primary Examiner*—Clifford C. Shaw
*Attorney, Agent, or Firm*—Robert D. Fish, Esq.; Fish & Associates, LLP

[57] ABSTRACT

A hand carried, or hand-held, portable, arc welding apparatus. Designed to provide a variable square waveform welding current output. Powered by sealed high discharge rate, gel-cell, rechargeable batteries that, are sealed for safety. A new form of welding technology is provided for saving energy and making automated tack welds. A new self-diagnostic feature is provided for safe operation. A remote control option is provided as well as a way to control the heating and cooling of the weld. Duty cycle control and frequency control are provided for efficient control of the welding process.

5 Claims, 9 Drawing Sheets

MINATURE BATTERY POWERED ARC WELDER

BACKGROUND

1. Field of Invention

This invention relates to battery powered, portable, hand carried arc welding apparatus.

2. Description of Prior Art

Traditional ac powered arc welding machines, used in commercial applications, have usually been large, heavy and bulky. And required large amounts of ac power. However, they were usually provided with abundant features and controls that, allowed the welding operator to make higher quality arc welds. Such as: Reverse polarity output, precise current control, square waveform output, current slope adjustments, frequency control, interval timer and other devices not mentioned here. Most battery powered, portable, hand carried arc welding machines lack most or, all of features that are common on ac powered welding machines. Therefore, most battery powered arc welding equipment is, not suitable for most arc welding requirements. Most battery powered arc welding equipment lack an efficient way for controlling current. They are usually somewhat large, heavy, and bulky, and usually not very practical in operation.

OBJECTS AND ADVANTAGES

Several objects and advantages of the present invention are:

(a) to provide a compact, portable, battery powered, efficient arc welder that is hand-held or hand-carried.

(b) to provide a battery powered arc welder that has duty cycle control.

(c) to provide a battery powered arc welder that has frequency control.

(d) to provide a battery powered arc welder that has a square waveform output.

(e) to provide a battery powered arc welder that has nickel cadmium batteries or gel cell batteries.

(f) to provide a battery powered arc welder that has precise output current limiting.

(g) to provide a battery powered arc welder that has remote control operation.

(h) to provide a battery powered arc welder that can make automated tack welds from a hand-held welder.

(i) to provide a battery powered arc welder that can control the length of the weld.

(j) to provide a battery powered arc welder that has self diagnostic features.

(k) to provide a battery powered arc welder that can control the heating and cooling of the welding process.

(l) to provide a battery powered arc welder that can help prevent the welding rod from sticking to the material being welded.

REFERENCE NUMERALS IN DRAWINGS

| | |
|---|---|
| 11 | cable |
| 14 | battery |
| 16 | common |
| 18 | cable |
| 20 | switch |
| 21 | capacitor |
| 22 | nor gate |
| 23 | capacitor |
| 24 | nor gate |
| 26 | nor gate |
| 28 | potentiometer |
| 30 | nor gate |
| 31 | capacitor |
| 32 | switch |
| 33 | capacitor |
| 34 | resistor |
| 36 | transistor |
| 38 | buffer |
| 40 | buffer |
| 42 | resistor |
| 44 | transistor |
| 46 | transistor |
| 48 | transistor |
| 50 | inverter |
| 52 | inverter |
| 53 | diode |
| 54 | switch |
| 56 | potentiometer |
| 58 | capacitor |
| 59 | cable |
| 60 | diode |
| 61 | switch |
| 62 | comparator |
| 63 | connector |
| 64 | potentiometer |
| 65 | capacitor |
| 66 | resistor |
| 68 | regulator |
| 70 | motor |
| 72 | potentiometer |
| 74 | comparator |
| 75 | transistor |
| 76 | diode |
| 77 | transistor |
| 78 | resistor |
| 80 | potentiometer |
| 82 | regulator |
| 84 | timer |
| 86 | transistor |
| 88 | diode |
| 90 | diode |
| 91 | transistor |
| 92 | lamp |
| 93 | resistor |

-continued

| | |
|---|---|
| 94 | alarm |
| 96 | nand gate |
| 98 | transistor |
| 99 | diode |
| 100 | transistor |
| 102 | transistor |
| 104 | transistor |
| 106 | transistor |
| 108 | transistor |
| 110 | varistor |
| 112 | resistor |
| 114 | diode |
| 116 | terminal |
| 118 | terminal |
| 120 | snubber |
| 122 | thermistor |
| 124 | relay contact |
| 125 | relay contact |
| 126 | relay contact |
| 127 | relay contact |
| 128 | relay coil |
| 130 | relay coil |
| 132 | switch |
| 134 | switch |
| 136 | switch |
| 138 | switch |
| 140 | switch |
| 141 | potentiometer |
| 142 | switch |
| 144 | potentiometer |
| 146 | switch |
| 148 | resistor |
| 149 | capacitor |
| 150 | capacitor |
| 151 | capacitor |
| 152 | capacitor |
| 153 | rod holder |
| 160 | current limiting |
| 162 | fan control |
| 164 | pulse weld |
| 166 | shorted output transistor |
| 168 | remote control |
| 169 | enclosure |
| 172 | reverse output polarity |
| 174 | high current power switch |
| 176 | duty cycle frequency control |
| 178 | load |
| 180 | reactor |
| 182 | cable |
| 184 | welding rod |

Figure 1:
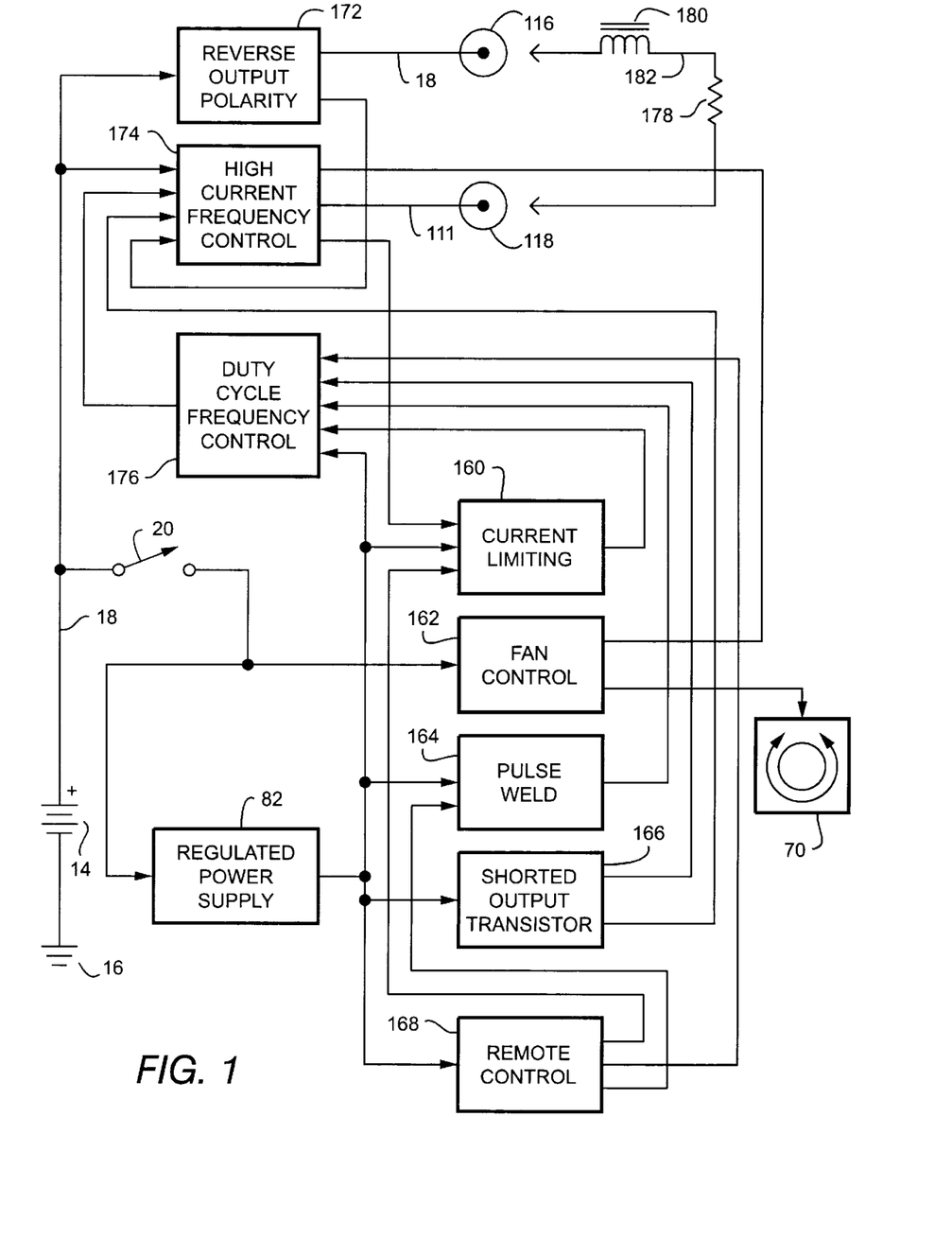
FIG. 1 show a block diagram of the basic construction of this invention
Figure 12:
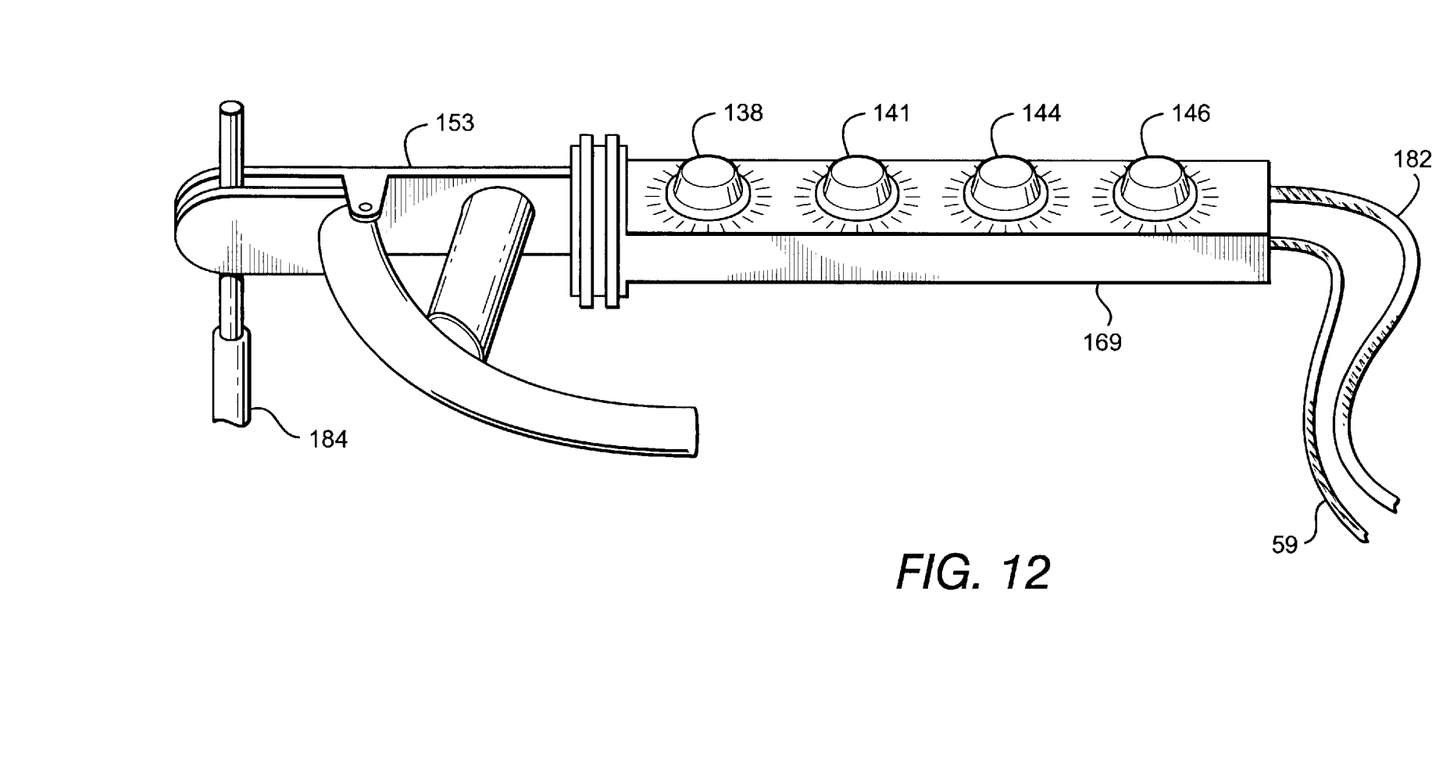
FIG. 12 is a drawing illustrating the construction of the remote control enclosure.

Operation—FIGS. 1, 12

Switching transistor output cable 11 is connected to transistor 98,100,102,104,106,108 and terminal 118. Battery positive cable 18 feeds switch 20 and reverse output 172 and, power switch 174 and, terminal 116.

Remote control cable 59 and, remote connector 63 provide remote control logic to remote enclosure 169.

Welding rod holder 153 provides a way to hold the welding rod 184 while welding. Welding cable 182 is connected to reactor 180 and rod holder 153. Remote enclosure 169 is attached to rod holder 153 to provide a convienient way for the welding operator to use remote potentiometers 138,141,144 and frequency selection switch 146.

Remote control four pole, double throw, switch 61 is located on the main welder enclosure and, is not located on the remote enclosure 169. Switch 61 must be in the remote position to provide control logic for all remote control devices.

Operation—FIGS. 2,3,4,5,6,7,8,9,10,11

Figure 2:
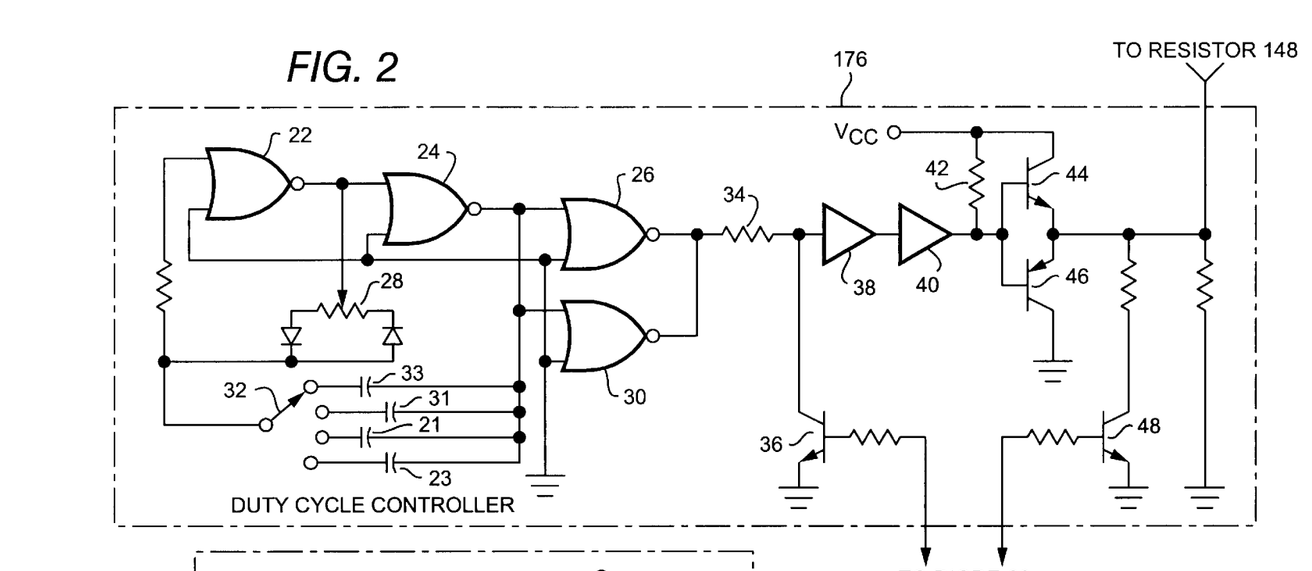
FIG. 2 is a diagram illustrating the construction of the duty cycle and frequency controller.

The manner of using the minature battery powered arc welder is generally, similar to most conventional arc welders. To make continuous welds, adjust potentiometer 28 as shown in FIG. 2 and frequency selection switch 32 for the type of weld desired. For lowest frequency welding use position 33. And, for highest frequency welding, use position 23. Next make a few test welds and, notice which frequency/duty cycle 28 combination setting gives the desired results. Try making overhead, and vertical test welds and, observe, which settings obtain the best results.

Figure 3:
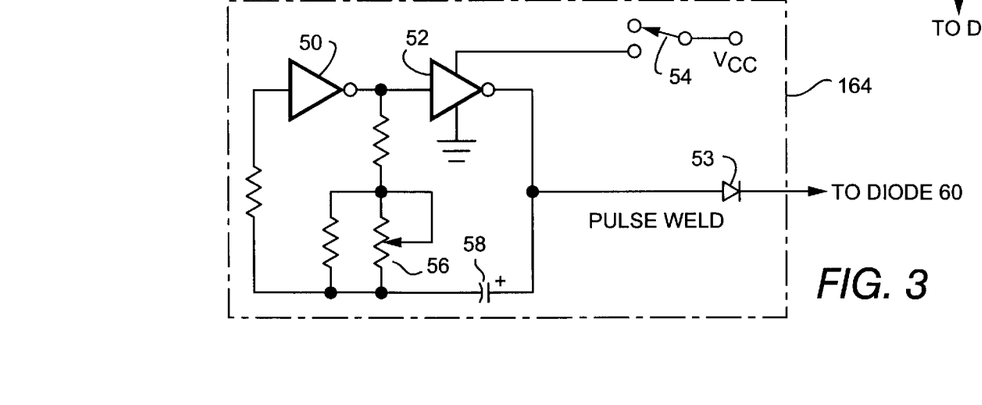
FIG. 3 is a diagram illustrating the construction of the pulse weld circuit.

FIG. 3 shows the control circuit for making pulse-welds, or tack welds. Turning on switch 54 will start the pulse-weld circuit. The welding output current will go on and off at the duty cycle frequency setting 21,23,31,33 shown in FIG. 2. The on/off pulse-weld 164 frequency 56 is independent of the duty cycle 28 and frequency 21,23,31,33 setting. This pulse-weld on/off frequency will provide control of the amount of tack welds made per second. Pulse-weld frequency control is provided by potentiometer 56 and capacitor 58.

Figures 4, 5:
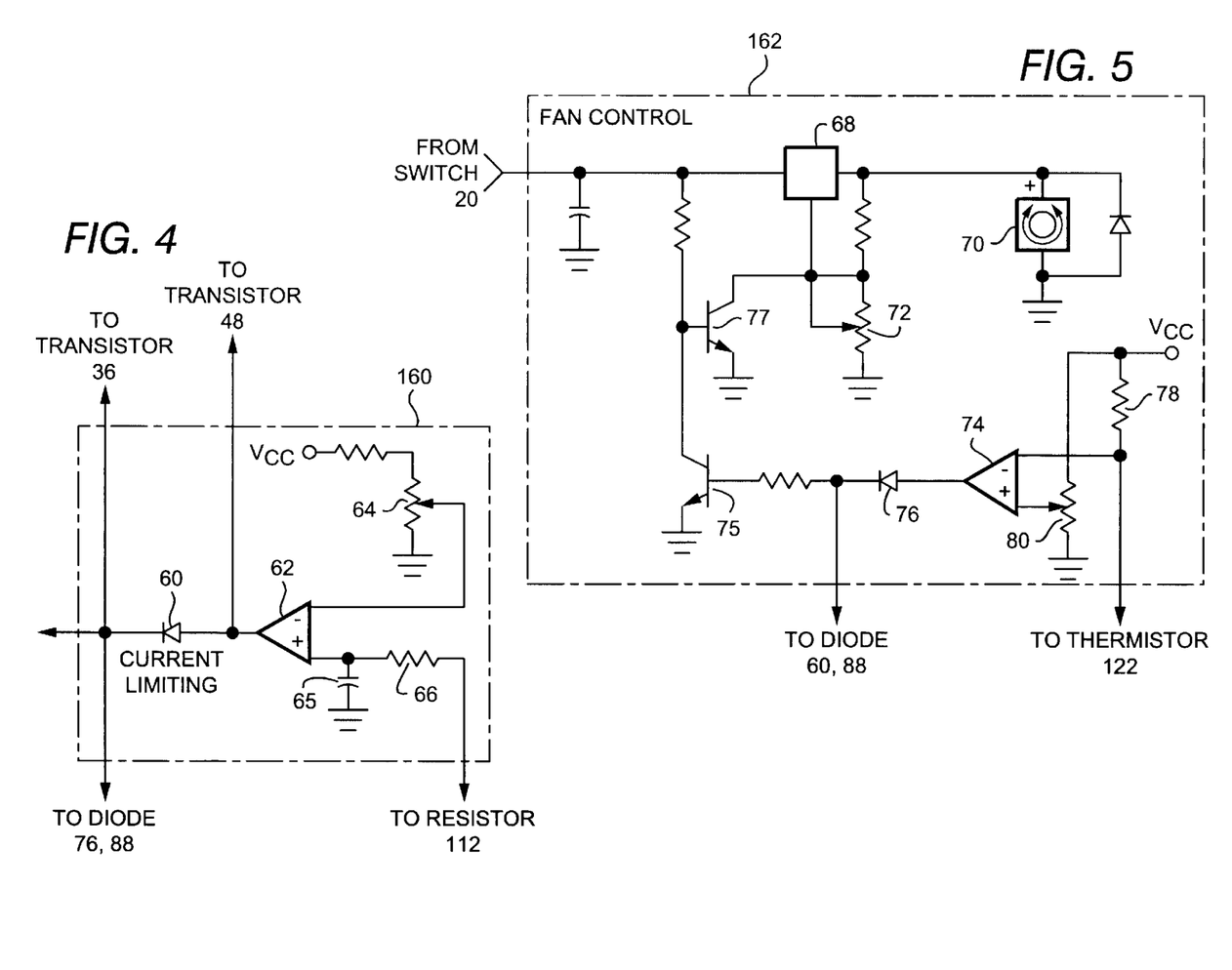
FIG. 4 is a diagram illustrating the construction of the current limiting circuit.
FIG. 5 is a diagram illustrating the construction of the fan control circuit.
Figure 6:
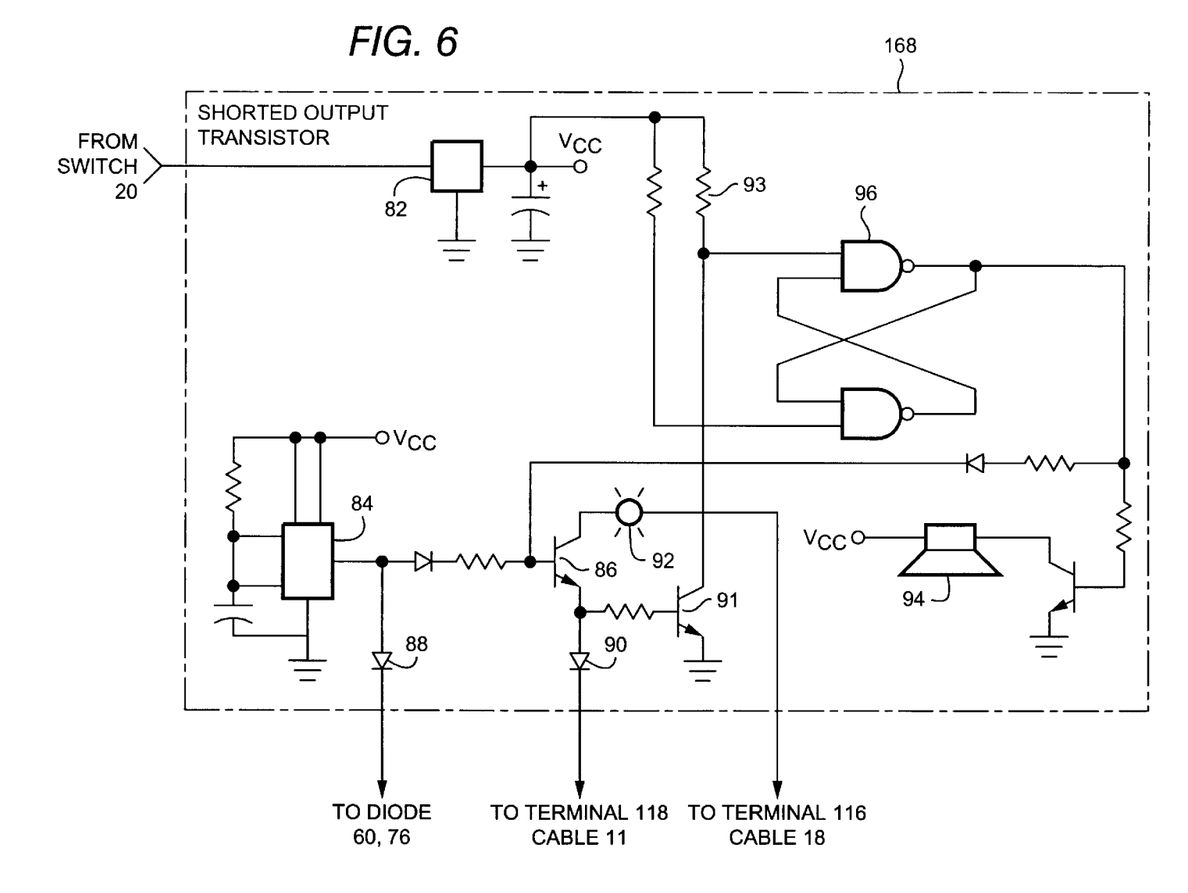
FIG. 6 is a diagram illustrating the construction of the shorted transistor circuit.
Figure 7:
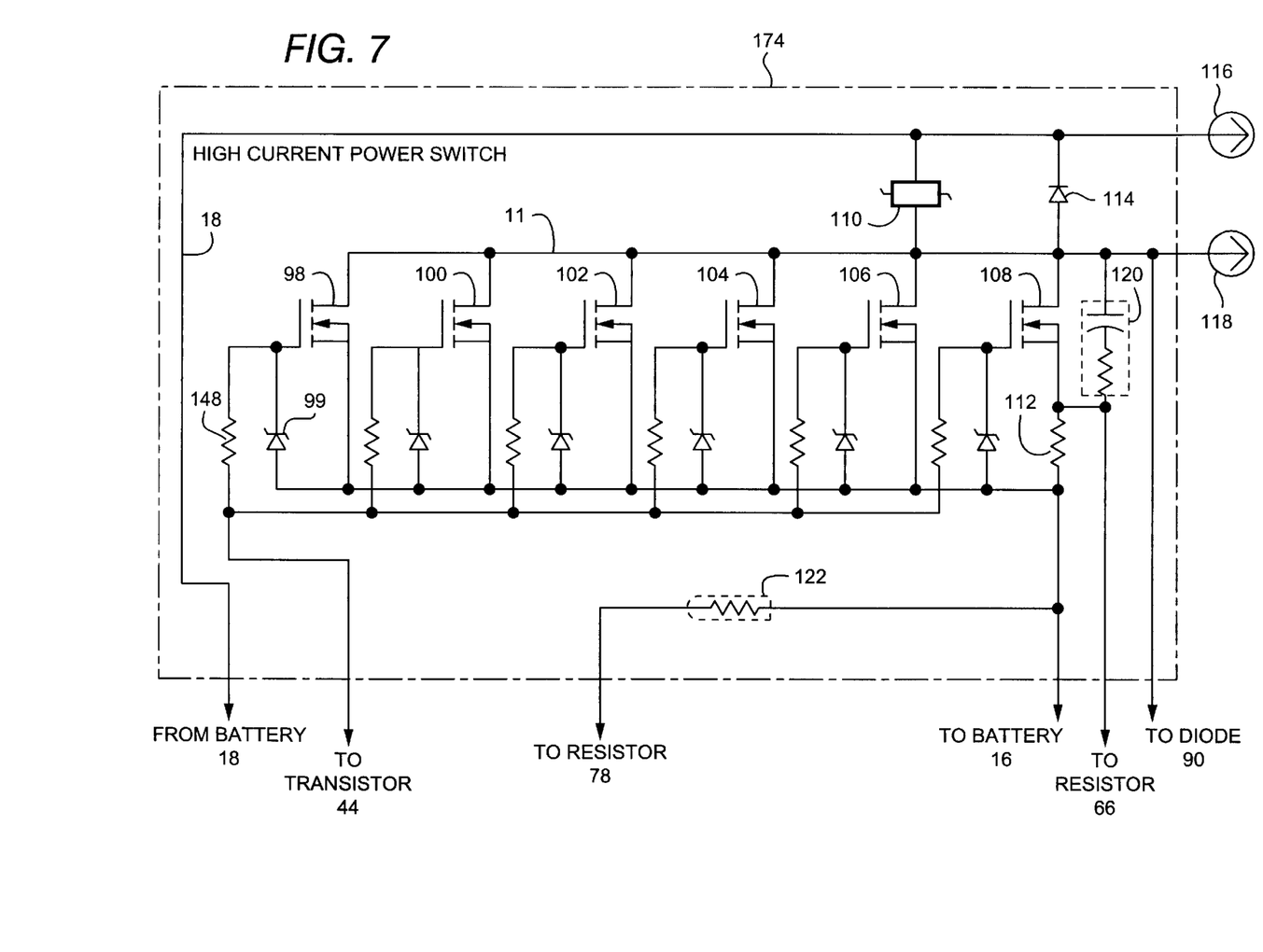
FIG. 7 is a diagram illustrating the construction of the high current power switch circuit.

FIG. 4 shows the current limiting circuit 160 which is used to limit welding current to a desired amount whether, tack welding, or normal welding. Potentiometer 64 is provided for this purpose. FIGS. 5,6 shows that the heatsink cooling fan motor is provided with automatic temperature sensing on/off operation using a thermistor 122 as shown in FIG. 7. This motor 70 is dc operated. A shorted transistor 98,100,102,104,106,108, as shown in FIG. 7 and a diagnostic circuit as shown in FIG. 6 is provided to warn the operator that a dangerous fault condition exists and, the welder switch 20 should be turned off immediately.

Figure 8:
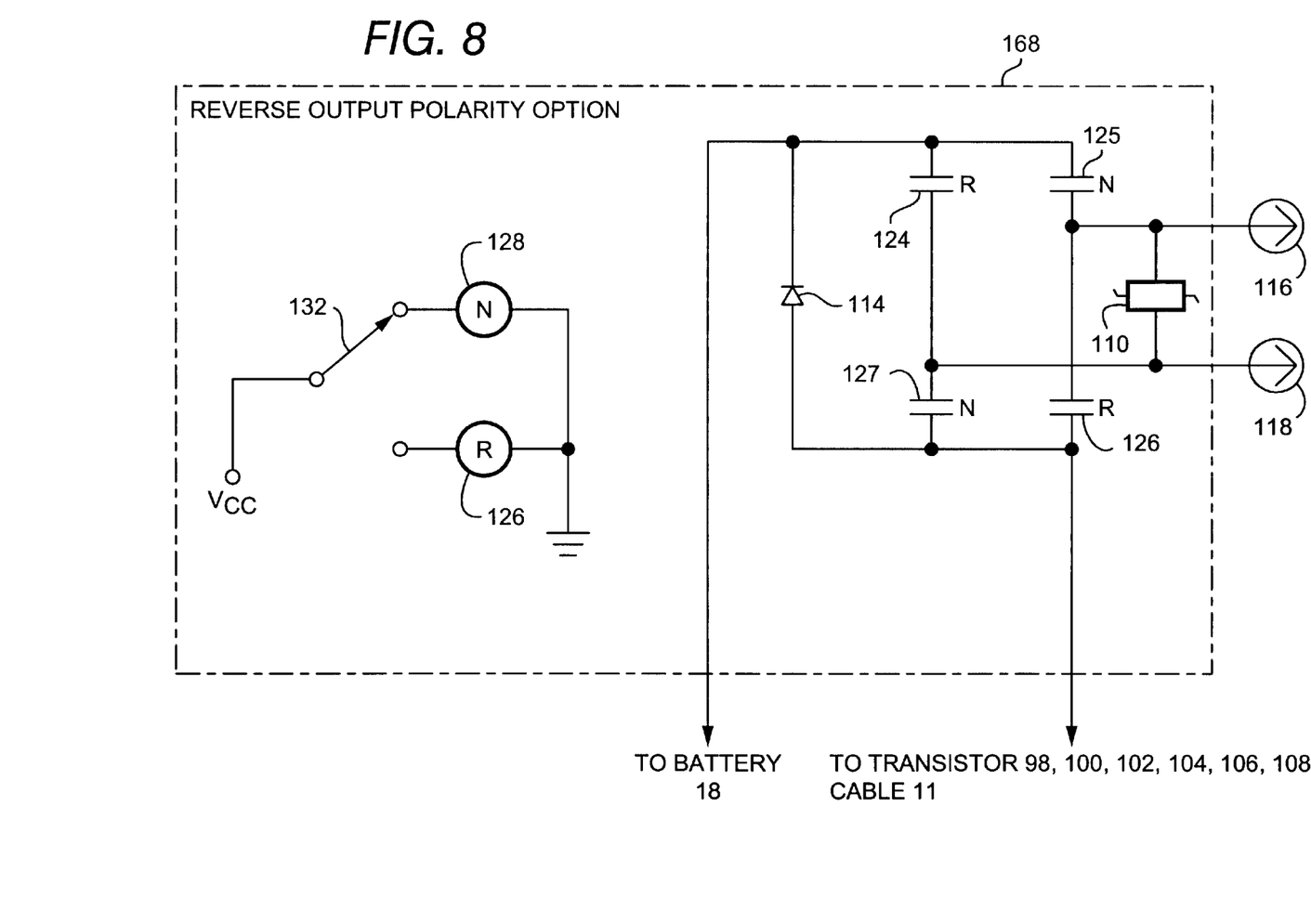
FIG. 8 is a diagram illustrating the construction of the reverse output polarity option circuit
Figure 9:
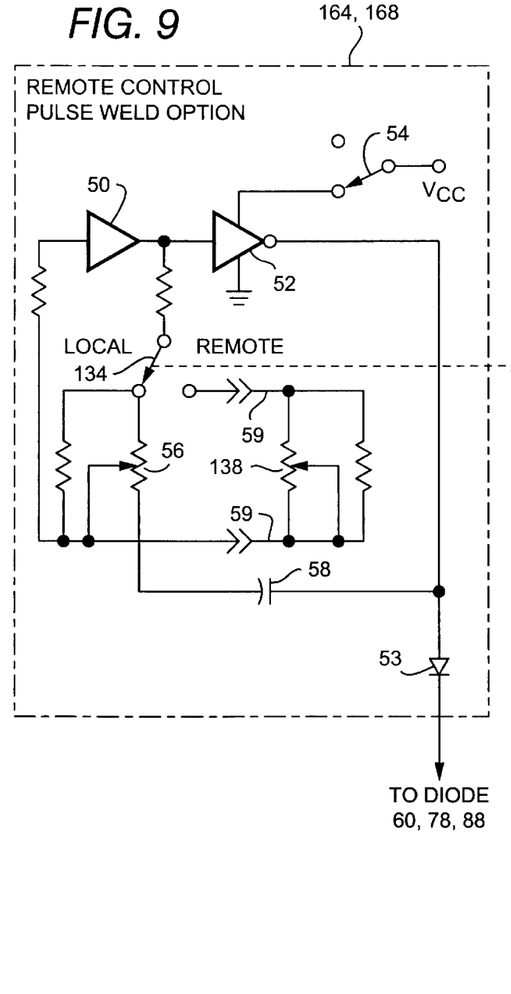
FIG. 9 is a diagram illustrating the construction of the remote control pulse weld option circuit.
Figure 10:
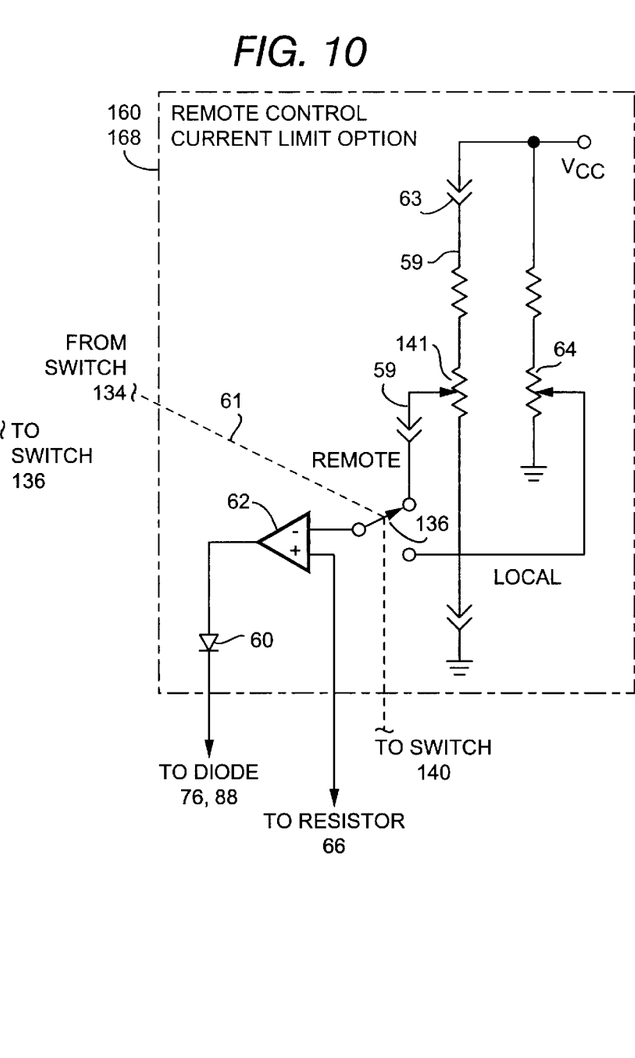
FIG. 10 is a diagram illustrating the construction of the remote control current limit option circuit.
Figure 11:
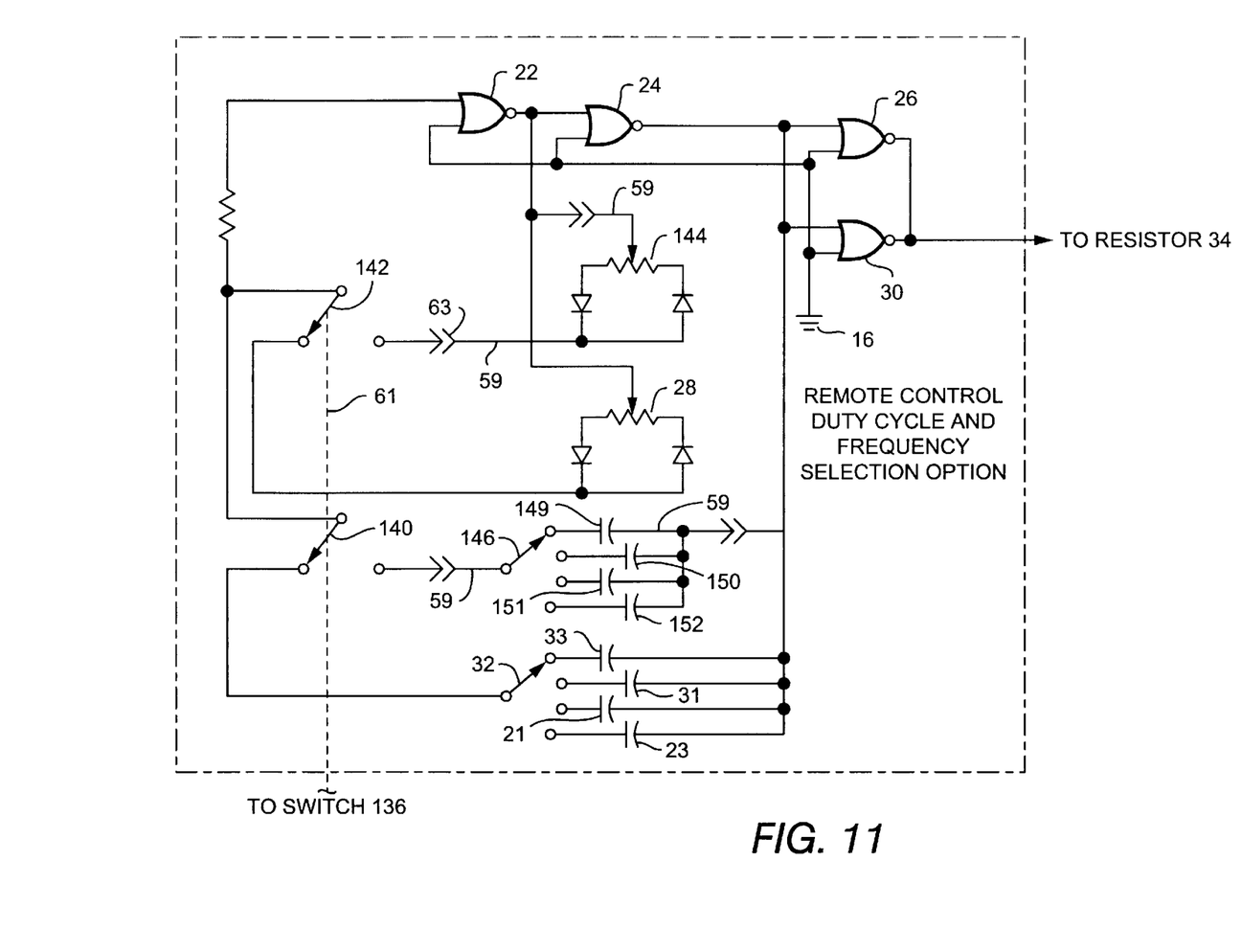
FIG. 11 is a diagram illustrating the construction of the remote control duty cycle and frequency option circuit.

FIG. 8 allows the welder operator a way to reverse the output polarity without removing and exchanging the welding cables. Remote control operation as shown in FIGS. 9,10,11 provides a way for remote operation when switch 134,136, 140,142 are turned on. Switch 146 allow remote operation of frequency control by offering various frequency positions as shown in FIG. 11. Remote potentiometer 144 provide duty cycle control. Remote Potentiometer 138 provide independent frequency control for tack welding only.

Remote potentiometer 141 provide current limiting control for welding current. Capacitors 149,150,151,152, provide the same function as capacitors 21,23,31,33 and allow the circuit to oscillate at a frequency determined by the value of the capacitor selected by the frequency selection switch 146.

SUMMARY

The object of this invention is to provide a low cost, more efficient, hand-held, battery powered, arc welding apparatus. It is another object of this invention to provide most features found on conventional ac powered arc welding equipment. It is still another object of this invention to introduce pulse weld technology in a hand-held, hand-carried welder. It is still another object of this invention to introduce an internal automatic fault indicating diagnostic system. It is still another object of this invention to introduce remote control operation.

DETAILED DESCRIPTION OF PREFERRED EMBODIMENTS

Battery power 14 provided by the 24 volt high discharge gel cells 14 provide welding current on demand. Output transistors 98,100,102,104,106,108 allow welding current to flow from the 24 volt battery 14 to the welding load 178 through connectors 116 and 118. Switch 20 provides control voltage to operate all control logic functions. The duty cycle controller 176 provides pulse width modulation. It is used to control output transistors 98,100,102,104,106,108. In other words, by varying the pulse width or duty cycle, the weld current will also vary. therefore this is an excellent system to use to control the welding current. When welding current exceeds the operator current control potentiometer 64, the duty cycle control 176 output control signal is reduced by the current limiting 160 circuit, resulting in reduced welding current to within the operator desired current limits 64. When switch 54 is turned on it, will allow the astable multivibrator 50,52 to begin pulsing on and off, at a frequency set by potentiometer 56 and capacitor 58. This will allow a high state pulse to turn on transistor 36 and will now reduce the duty cycle control signal through resistor 34 to near zero.

When transistor 36 is turned on, no weld current will flow during the on interval. Due to lack of the duty cycle signal on the gates of transistors 98,100,102,104,106,108. During the off interval, the output of multivibrator 50,52 is in a low state. Allowing transistor 36 to remain off until the next high state pulse arrives at the base of transistor 36. Therefore, the duty cycle control signal will resume at its former setpoint 28,56,64. Allowing weld current to flow, due to the duty cycle control signal on the gates of transistors 98,100,102, 104,106,108. In other words, in the pulse weld mode, the welding current will turn on and off until stopped by the operator. The on/off frequency is determined by potentiometer 56 and capacitor 58. Potentiometer 28 will control the duty cycle. Potentiometer 64 will control current limiting or welding current. When the welding current is turning on and off at a, operator set frequency 56 it is referred to in this patent application, as pulse weld 164. It is designed to allow the welding operator to make automated tack welds to save energy. Frequency selection 32 is provided to also help prevent the welding rod from sticking to the material being welded. Still another benefit for the welding operator is, there is no need to lift the welding rod up off of the material being welded, every time a tack weld is required.

Therefore, it is now possible to tack arc weld in an automated fashion with this welder. This welder will allow an operator to make more and faster tack welds per linear foot. Another benefit from this welder is, since these are tack welds, and not regular welds, more welds per battery charge are now possible. Less battery 14 energy is required to make a tack weld because of the short on duration of energy leaving battery 14. When switch 54 is turned off all welding will be semi-continuous, or continuous welds depending on the frequency selected by switch 32. This should allow more efficient overhead, vertical and flat welding results. This is made possible due to the ability to control the on and off time of the welding current flow in the welding load 178. Herein described as the duty cycle 28 and frequency selection 32. A lower on frequency, will allow more cooling of the material being welded. While, a higher on frequency, will allow less cooling of the material being welded. Herein referred to as the load 178. Output welding current is smoothed by an external inline current reactor 180. The reverse polarity option 172 is controlled by switch 132. Switch 132 energizes normal 128 relay, and reverse 130 relay. Relay contacts 124,126 provide current reversal, while contacts 125,127 allow normal polarity. Remote control 168 operation, is arranged through a four pole double throw switch 134,136,140,142.

A separate control cable from the welder enclosure, to the remote location, is provided to connect the remote control components 138,141,144,146 which, are mounted in a small enclosure, attached to the welding rod holder. This will allow a convenient remote operating location for the welding operator. Resistor 148 provides gate signal equalization.

Resistor 78 is part of thermistor 122 voltage divider circuit. Resistor 66 and capacitor 65 provide noise reduction from the welding current feedback signal.

Fan control 162 operates by turning the adjustable voltage power supply 68 on and off by comparator 74. When its output is high, the heat sink cooling fan motor 70 is controlled by actual heat sink temperature by comparator 74. A heat sink mounted, negative temperature coefficient thermistor 122 operates as a serarate part of a voltage divider circuit with resistor 78. By providing a signal into comparator 74, that is compared with the set point of resistor 80. Therefore, whenever the thermistor 122 output signal exceeds that of potentiometer 80, the output of comparator 74 will be high. Turning on transistor 75, which will turn off transistor 77 and, making regulator 68 output high. Driving the cooling fan motor at a speed set by potentiometer 72.

A cmos quad, 2 input nor gate 22 comprise an astable multivibrator 22,24 running, at a frequency chosen by the frequency select switch 32,146. The duty cycle is set by potentiometer 28, an d 144. Nor gates 26,30 provide a buffered output to, drive a cmos, non-inverting buffer 38, and interfaces with a ttl non-inverting buffer 40, that has open collector outputs. These open collector outputs, are used to pull resistor 42 down to near zero volts, on negative pulses, thereby removing the base drive from transistor 44.

This will make transistors 98,100,102,104,106,108 turn off, and not allow any weld current to flow into the load 178 from connectors 116,118. Transistor 46 is turned on by the same negative pulse, and provides a way to discharge the stored gate capacitance on the gates of transistors 98,100, 102,104,106,108.

When a positive pulse arrive at pull-up resistor 42, and the base of transistor 44, transistors 98,100,102,104,106,108 will turn on allowing weld current to flow into the load 178 from connectors 116,118. Diode 114 serves as a fast recovery, free wheeling diode across the load 178. Metal oxide varistor 110 provides a way of controlling unwanted, voltage transients across the load 178. The snubber 120 protects the drain 118, and source 16 connection from voltage transients that could ruin transistors 98,100,102,104, 106,108.

The amount of controllable weld current flowing into the load 178, is pulse-width, or time dependent. Comparator 62 provides current limiting by comparing the weld current flow through resistor 112 with, the operator adjusted, current limit set point potentiometer 64. When the current limit setpoint is exceeded, comparator 62 output will go high, turning transistor 36 on, and driving the collector load of transistor 36, which is resistor 34 low.

The duty cycle signal travels through resistor 34, and is normally high. Except when transistor 36 is turned on, the duty cycle signal is made low, preventing this signal from arriving at the gates of transistors 98,100,102,104,106,108. Without gate drive no weld current can flow into the load 178. Zener diode 99 provides gate protection against voltage transients.

Transistor 48 is energized only during overcurrent conditions. And provides a clamp to help control gate impedance during overcurrent conditions. A timer 84 is configured as a power-up one shot astable multivibrator, providing a 15 to 20 second duration positive output pulse. Therefore, this timers output will go high, every time the on-off switch 20 is turned on, and stay low after it has timed out. It is used to control the shorted output transistor circuit 166. Also to remove the duty cycle signal by turning on transistor 36 during the one shot timing duration.

When the duty cycle signal is off, no weld current should flow. except when there is a shorted transistor drain 118 and source connection 16. The shorted transistor 166 circuit will work only when the timer 84 output is high turning on transistor 86, allowing current to flow through lamp 92 and, turning on transistor 91, driving resistor 93 low, driving r-s latch nand gate 96 output high. When nand gate 96 is high, it will latch transistor 74 on until it is reset by turning off switch 20. Alarm horn 94 will also latch on.

If, there is a shorted transistor 98,100,102,104,106,108 current will flow through transistor 86, lamp 92, and blocking diode 90, and continue through the shorted transistor drain connection 118 and source connection 16. No gate signal should be present. Afterwards the alarm and fault indicating lamp and horn 94 will be latched on until switch 20 is turned off. Regulator 82 will provide regulated voltage to all logic circuits.

Although the description above contain many specificities, these should not be construed as limiting the scope of the invention but merely providing illustrations of some of the presently perferred embodiments of this invention. For example, the size of the welders enclosure can be larger or smaller than minature, or the battery can be more or less than 24 volts. Thus the scope of the invention should be determined by the appended claims and their legal equivalents, rather than by the examples given.

I claim:

1. An arc welding apparatus comprising:

a battery powered current source;

a rod holder coupled to the current source;

a duty cycle controller controlling the duty cycle of a pulsed current flowing from the current source and into the rod holder;

a pulse weld controller controlling the flow of the pulsed current to the rod holder and causing the pulsed current to turn on and off at a fixed tack weld frequency;

the tack weld frequency and duty cycle being independent of each other.

2. The arc welding apparatus of claim 1 further comprising a transistor and an internal test circuit which measures the impedance across two terminals of the transistor and prevents current from flowing from the current source to the electrode if the measured impedance drops below a threshold value.

3. The arc welding apparatus of claim 2 further comprising an enclosure positioned on or adjacent to the rod holder, the enclosure comprising controls for varying at least one of the duty cycle, tack weld frequency, and current limit of the pulsed current flowing into the rod holder.

4. The arc welding apparatus of claim 3 further comprising a cable through which the pulsed current flows on its way into the rod holder, and a current smoothing reactor located in the cable.

5. The arc welding apparatus of claim 4 wherein the apparatus is sized and dimensioned to allow the apparatus to be hand-held during operation.

* * * * *